Patented Sept. 13, 1927.

1,642,192

UNITED STATES PATENT OFFICE.

ARNOLD K. BALLS, OF PHILADELPHIA, PENNSYLVANIA.

METHOD OF PROPAGATING YEASTS.

No Drawing.  Application filed July 18, 1923. Serial No. 652,455.

This invention relates to the manufacture of yeast for baking and other purposes by the use of a particular race of yeast, and more particularly to the production of yeast in very large yields, of good color, keeping qualities, and baking strength, by using chiefly as raw material crude West Indian molasses which has never before been successfully used in yeast manufacture (except for very low yields) and also by using a new race of yeast whereby these novel results are obtained.

This organism is apparently a new species of Saccharomyces and was isolated by well known bacteriological means from a fermenting molasses solution. It is reasonable to suppose that the yeast in question has had an environment of cane molasses for many generations in the past, and has thereby acquired certain tolerances for constituents of crude molasses and waste syrups, which are not possessed by other Saccharomyces. Whether these differences are sufficient from a purely botanical standpoint to classify this yeast as a new species or not, they are ample to differentiate it markedly from any other known race of yeast in regard to rate of growth and in particular, its behaviour in cane molasses.

It has been shown, principally by Slator-Biochem. Jour. vii (1913), that in a definite medium, a yeast grows according to a definite law, the so-called logarithmic law, represented by Euler—Chemie der Hefe, p. 253, in Briggs' logarithms by the expression $$0.4343 K't = \log(a+x) - \log(a)$$

in which $K'$ is a constant, so derived as to be a positive number, $a$ is the amount of yeast at the beginning, and $a+x$ the amount of yeast at the end of growth. The significance of K is given also by Euler—ibid, p. 255—as follows: ". . . the growth constant $$K = 0.4343 K' = \frac{1}{t} (\log (a+x) - \log (a))$$

is then an exact measure of the speed of growth." Growth finally becomes impeded due to lack of food, the toxic effect of the accumulation of various metabolic products, etc. The constant, however, when determined on a species of yeast during that period of the growth cycle when growth is unimpeded shows the speed at which the yeast is capable of growing in a particular medium.

Different yeasts are capable of growing in a medium such as molasses for instance, at different rates of speed, which, since the medium is the same, depend solely upon the reproductive ability of the yeast, that is to say, upon a quality inherent in the yeast cell itself. The possession of a low, or of a high, reproductive ability under the circumstances, is as much a definite characteristic of the yeast in question as the shape of the cells, and more definite than the ability to ferment mannose or lactose.

The organism which I have isolated, and which is an integral part of this invention, because without its use the same striking results cannot be obtained, is characterized by having a higher growth constant in molasses media, and particularly in cane molasses media, than any of the other organisms tested by me, which includes all the ordinarily used species of alcohol forming yeasts, whose growths can be successfully removed from the liquid by filtration, centrifugation, and the like known processes. There are yeasts whose growths are so slimy that it is not practical to remove them from solutions. Such yeasts have no practical value at this time and are not included in the scope of this work.

This yeast forms no spores, no scum, no marked sedimentation, and its cytological characteristics are those of an ovoid yeast of the Saccharomysec genus reproducing by budding. The morphological characteristics are not specific or distinguishing except the ability of the yeast to grow as separate cells.

An experiment, for example, comparing this new yeast with one of the best growing known races in use *S. cerevisiæ*, under exactly similar conditions in a medium of diluted molasses, ammonium phosphate and ammonium sulfate, showed values of K—the growth constant of Euler—as follows:

| Hours of growth. | In beet molasses. | | In cane molasses. | |
|---|---|---|---|---|
| | Commonly used baking yeast. | New yeast. | Commonly used baking yeast. | New yeast. |
| 4 | 86 | 112 | 45 | 97 |
| 7 | 63 | 122 | 52 | 93 |
| 10 | 52 | 99 | 38 | 89 |

These figures show not only the greater rapidity of growth of the new yeast, but also the fact that it grows as well on cane molasses without any clarification or special treatment as the other yeast grows on beet molasses.

In addition to the above methods of differentiating this yeast from the varieties used heretofore, it may also be distinguished by the fact that during its entire period of growth, it is always very finely divided and shows very little tendency to settle or sediment. Under the microscope, the cells are seen to be all separate except where an undeveloped daughter cell has not divided off from the parent. Even in unstirred solutions and on solid media, this tendency to separate instead of growing in clumps and chains is marked and enables the yeast to be easily distinguished after a little practice from the various races of *S. cerevisiæ* which at the outset of any stage of multiplication, grow in chains or in clumps.

Because of the peculiarity of this characteristic and its probable significance on the growth rate, it has been proposed to name this yeast *S. disjunctus*—sp. nov. The fact that the cells are so separated allows the entire membrane of each cell to be completely surrounded by a layer of the nutrient solution, which accounts no doubt in some degree, for the greater metabolic activity of the species.

This increased metabolic activity is evidenced on the part of the yeast in the direction of growth rather than fermentation. Since the synthesis of protein requires nitrogen, one might expect the nitrogen consumption of this yeast to be greater than that of *S. cerevisiæ*. My experiments have shown that the yeast can withdraw ammonium nitrogen from the medium in about twice the amount used by *S. cerevisiæ* under the same conditions. The large quantities of nitrogen if added in the form of highly ionized ammonium hydroxid and ammonium salts at the start of a fermentation would produce undesirable osmotic effects, consequently, it is recommended to add these, as is often done, periodically during the life of the mash, either mixing in with freshly added molasses, or separately. The precise times and quantities always must be left to the discretion of the operator and it is impossible to say that one definite way is going to give materially different results from another.

The use of large quantities of ammonium salts can be avoided however by substituting part or all of the nitrogen so added by urea, peptone or a mixture of the two, which last gives very excellent results.

Another novel feature of this invention is that it requires no stock yeast, in the sense that other processes do; that is, a yeast of superior multiplication ability prepared by a special and expensive mash, usually from grain. In the process of this invention, there is no stock mash, the seed for the fermenter being grown in steps from the original culture in quantities adapted to produce a reproduction of not less than four, or more than eight times the seed used in this step. These steps, therefore, are all alike, except in regard to the quantities of the materials taken.

I have found that this race of yeast possesses the peculiar property of preventing the growth of organisms of the mycederma yeast type and very often kills them off.

The yeast *S. disjunctus* has also been tested, in comparison with other yeasts to determine its fermenting characteristics on various sugars, and has been found to differ from all of these other yeasts in its fermenting properties. The other yeasts employed in this test were *S. cerevisiæ* Frohberg type, Hansen, Saaz type, Ruppert's yeast, an English ale yeast, Race XII, *S. logos*, *S. pastorianus*, *S. apiculatus*, *S. ellipsoideus* II, and *S. Validus*. All of the yeasts employed were cultivated for a period of nine months in saccharose, and all the specimens ferment saccharose and dextrose. The most characteristic difference between the present yeast and other known yeasts, from a fermenting standpoint, is its ability to ferment inosite (a cyclo-hexane derivative. Inosite is commonly used in the same manner as true sugars in determining the fermenting characteristics of microorganisms. This, as far as I know, is unique among such organisms. None of the other known yeasts employed in the experiments has the property of fermenting inosite. All of the yeasts employed in the experiments will ferment fructose and mannose, and most of them will ferment maltose and raffinose. *S. disjunctus* has the property of fermenting all of these sugars and has the further property of fermenting galactose, which is possessed by only four other yeasts, namely, Frohberg type, Race XII, *logos*, and *pastorianus*. None of the yeasts employed, including *S. disjunctus*, would ferment a solution of penta acetyl glucose, and *logos* and *disjunctus* were the only yeasts capable of fermenting a solution of alpha methyl glucoside.

I have also conducted experiments to identify the yeast *S. disjunctus* by precipitin tests, which is simply an application of the well known methods of differentiating bacteria, to yeast.

The serum is prepared by injecting a suspension of yeast cells into a rabbit at various intervals, then bleeding the rabbit, and removing the clear serum from the clotted blood.

In the following tables are shown the results obtained from the treatment of known yeasts with a serum of *S. disjunctus* yeast and also the use of sera from the known yeasts and the culture of *S. disjunctus*. The tests are specific in showing that *S. disjunctus* reacts strongly with its own serum only and that other sera do not react with the culture of *S. disjunctus*, although reacting with the yeast from which they were made. In the table, a single cross represents a slight reaction, two or three crosses heavier reactions, and four crosses a very heavy reaction. The first table shows the results obtained from tests conducted on well known commercial yeasts:

| Dilution | Serum S. cerevisiæ Hansen | | | | | | Serum S. cerevisiæ Frohberg | | | | | | Serum S. cerevisiæ Saaz | | | | | | Serum S. disjunctus | | | | | |
|---|---|---|---|---|---|---|---|---|---|---|---|---|---|---|---|---|---|---|---|---|---|---|---|---|
| | 1/10 | 1/50 | 1/100 | 1/500 | 1/1000 | 0 | 1/10 | 1/50 | 1/100 | 1/500 | 1/1000 | 0 | 1/10 | 1/50 | 1/100 | 1/500 | 1/1000 | 0 | 1/10 | 1/50 | 1/100 | 1/500 | 1/1000 | 0 |
| Red Star | 0 | 0 | 0 | 0 | | 0 | ++++ | +++ | +++ | +++ | | 0 | + | + | + | + | | 0 | +++ | 0 | 0 | 0 | | 0 |
| Consumer's | 0 | 0 | 0 | 0 | | 0 | 0 | 0 | 0 | 0 | | 0 | ++++ | ++++ | ++++ | +++ | | 0 | 0 | 0 | 0 | 0 | | 0 |
| Fleischmann | + | + | 0 | 0 | | 0 | +++ | ++ | + | 0 | | 0 | 0 | 0 | 0 | 0 | | 0 | 0 | 0 | 0 | 0 | | 0 |
| Magic | + | 0 | 0 | 0 | | 0 | ++ | + | 0 | 0 | | 0 | 0 | 0 | 0 | 0 | | 0 | 0 | 0 | 0 | 0 | | 0 |
| Peerless | + | + | + | 0 | | 0 | ++++ | +++ | ++ | 0 | | 0 | 0 | 0 | 0 | 0 | | 0 | 0 | 0 | 0 | 0 | | 0 |
| A. F. Callahan | + | + | + | 0 | | 0 | ++ | ++ | 0 | 0 | | 0 | 0 | 0 | 0 | 0 | | 0 | + | 0 | 0 | 0 | | 0 |
| Austrian | 0 | 0 | 0 | 0 | | 0 | ++++ | +++ | ++ | 0 | | 0 | ++ | 0 | 0 | 0 | | 0 | + | 0 | 0 | 0 | | 0 |
| International Yeast Co. of England | 0 | 0 | 0 | 0 | | 0 | ++++ | +++ | ++ | + | | 0 | ++ | +++ | 0 | 0 | | 0 | | 0 | 0 | 0 | | 0 |
| S. disjunctus | | 0 | 0 | 0 | 0 | 0 | | + | + | 0 | 0 | 0 | | + | 0 | 0 | 0 | 0 | | ++++ | ++++ | +++ | ++ | + |

From this, we can see that Red Star is using a mixture of Saaz and Frohberg cultures. The Consumer's are not identified by the sera used here, Fleischmann is a Frohberg yeast with perhaps *cerevisiæ* Hansen mixed with it, Callahan is the same and so on. It is to be noted none of them correspond to *S. disjunctus*.

The following table shows the results obtained when a serum of *disjunctus* is added to a solution of other yeast and also the results obtained when sera of other yeasts and *disjunctus* yeast are added to the other yeast.

| Dilution. | Serum *disjunctus* with other yeast. | | | | | | Other sera with *disjunctus* yeast. | | | | | |
|---|---|---|---|---|---|---|---|---|---|---|---|---|
| | 1/10 | 1/100 | 1/1000 | 1/10000 | 1/100000 | 0 | 1/10 | 1/100 | 1/1000 | 1/10000 | 1/100000 | 0 |
| *Validus* | ++ | 0 | | | | | + | + | 0 | | | |
| *Ellipsoideus* | ++ | 0 | | | | | ++ | + | 0 | | | |
| *Apiculatus* | ++ | 0 | | | | | 0 | 0 | 0 | | | |
| *Pastorianus* | + | 0 | | | | | 0 | 0 | 0 | | | |
| *Saaz* | +++ | 0 | | | | | + | 0 | 0 | | | |
| *Frohberg* | +++ | ++ | 0 | | | | + | + | 0 | | | |
| *Hansen* | 0 | + | 0 | | | | 0 | 0 | 0 | | | |
| *Ruppert's* | ++ | 0 | | | | | +++ | 0 | 0 | | | |
| *Ale yeast* | ++ | 0 | | | | | ++ | 0 | 0 | | | |
| *Race XII* | ++ | 0 | | | | | | | | | | |
| *"Disjunctus"* | ++++ | ++++ | +++ | ++ | + | 0 | ++++ | ++++ | +++ | ++ | + | + |

The other sera referred to in the heading in the second column in the above table are prepared from the yeasts specified in horizontal rows to the left.

In growing yeast according to the modern processes, aeration is employed and this is frequently accompanied by the growth of other organisms, such as wild yeast and bacteria, many of which are very detrimental to the culture yeast itself. Various methods of lessening this danger are known, such as cleaning, partial sterilization by heating, or by addition of antiseptics and the like (see the patent to Hayduck, No. 1,449,112). However, in spite of these precautions, the danger still remains, and as air itself quite often contains members of the so-called mycoderma yeast group which are among the commonest as well as the most dangerous infections in heavily aerated mashes where the acidity is low, the general tendency of the more modern practices is to lead to the formation and growth of mycoderma yeast.

The saving in labor and attention to the mash and the added certainty of obtaining good yeast are obvious advantages. This is especially true of yeast to be used in repropagation, that is, stock yeast, because an infection of the stock is usually multiplied many times in the succeeding mash.

To prevent growth of organisms of the mycoderma yeast type, small proportions of this race of yeast may be mixed with stock yeast to be used in any process of yeast propagation and upon growing the mixed culture, it will be found that mycoderma yeast present do not multiply but on the other hand, generally decrease in amount.

This yeast may be employed in a mixture with yeasts now generally employed for baking purposes without deleteriously effecting the color, yield, baking strength or keeping quality of the yeast. The amount of admixture of the new yeast to be used may vary within wide limits, as little as one-fifteenth of the total stock being found sufficient to prevent the growth of mycoderma yeast and as much as one-half may be used without injurious action on the product.

As an example, the following experiment was performed:

Four aerating jars containing the same amounts of a molasses medium were heavily infected with a suspension of mycoderma yeast, and to each was added as stock, different proportions of a well known baking yeast and of my newly isolated race. Air was blown into all at the same rate, and at intervals during the experiment, cell counts of mycoderma yeast and of baking yeast present, were made.

*Composition of the stock yeast.*

| Cc. of a suspension in water. | Jar A. | Jar B. | Jar C. | Jar D. |
|---|---|---|---|---|
| S. cerev. 3 g. per 50 cc | 12.5 | 12.5 | 12.5 | 12.5 |
| New race 3 g. per 50 cc | 0 | 12.5 | 6.25 | 12.5 |
| Mycoderma yeast | 10 | 10 | 10 | 20 |

Cell counts during the experiment:

[Average count—cells per 1-4000 cu. mm. liquid.]

| Hour of experiment. | A. | B. | C. | D. |
|---|---|---|---|---|
| At start | 2-8 | 2-14 | 2-9 | 4-13 |
| 3.5 | 2-7 | 2-18 | 1-13 | 2-14 |
| 9.5 | 3-7 | 1-31 | 1-24 | 1-22 |
| 20.5 | 6-7 | 2-57 | 2.5-45 | 1-53 |

Of the pairs of figures, the first figure is the number of mycoderma cells, the second the number of baking yeast cells.

This new yeast differs from known yeasts not only in growing better in molasses, but by growing with the production of a white yeast of good baking qualities in the most highly colored and impure varieties of molasses, particularly that grade known as crude Cuban cane, which in the trade usually designates any low grade West Indian molasses, or sugar house waste. Such Cuban cane molasses is black in color and contains many substances of phenolic structure inhibitory and even toxic to other yeasts. It is much darker and more impure than the so-called refiners molasses on which the commercial growth of yeast has been claimed. It is so different from the "molasses" of the prior art as to be considered an entirely different substance.

From Cuban cane molasses, a yield varying from fifty to one hundred per cent of the weight of the molasses can be obtained of good baking yeast having excellent color and keeping qualities, without any preliminary purification or clarification of the molasses, using this new culture and process.

Due to the inhibiting action on most bacteria and moulds of some of the cane molasses constituents remaining in the pressed yeast, this yeast keeps very well. It is notable for exceptional viability on drying for the same reasons.

In practicing the process, the yeast may be propagated by any of the usual methods and I prefer to employ crude West Indian molasses whenever possible on account of its relative cheapness. The provision of larger quantities of nitrogen than is usually necessary in the propagation of yeast may be obtained by the use of ammonia, ammonium salts or other amino or amido compounds. When good baking qualities are desired, the propagation should be controlled by preventing multiplication exceeding eight or ten times the stock added. Phosphoric acid in some simple form, such as phosphate, may be added in an amount commensurate with the yield expected and the common practice of fermenting in a weak acid solution should be adhered to. The acidity of the solution may be determined in the usual manner by the use of litmus paper or hydrogen ion measurements and ammonia or other alkali added to the solution at intervals in an amount sufficient to reduce its acidity without rendering the fermenting solution alkaline. If alkalinity appears impending in the mash, a sufficient amount of sulfuric acid or other acid may be added to render it sufficiently acid. The usual separating, pressing, and subsequent handling steps now employed in common practice may be resorted to in separating the yeast from the solution and placing it in proper condition for marketing or other handling.

The baking quality of this yeast may be further improved if a baking yeast is desired rather than a yeast for fertilizer, stock food and the like, to which the process is equally applicable. This improvement is obtained by restricting the multiplication of the yeast and not allowing an increase of more than eight or ten times the original stock in a single fermentation. If the multiplication of the yeast is not restricted, its emphatic tendency to reproduce at all hazards causes the cells to become weakened.

As an example of the most approved form of the process, the following is given:

One hundred pounds of crude West Indian cane molasses is diluted to about four times its bulk with water, heated to approximately 70° C., and filtered if any solid débris must be removed. About ten per cent of the filtrate is placed in the fermenter and diluted to about one hundred gallons with water. The yeast is added to the fermenter in amount from five to twenty per cent of the total molasses, but for good baking yeast, about fifteen per cent is best. From one to two pounds of ammonium phosphate and about half that quantity of ammonium sulfate is also added to the fermenter, which is maintained at as near 28° C. as possible. A heavy current of air is set up and aqua ammonia, preferably diluted, allowed to run in slowly at such a rate that the acidity does not drop materially below that equivalent to 0.05 cc. of normal solution per 10 cc. mash. The rate should be varied by the operator during the process. The ammonia is added continuously until between five and seven pounds of strong aqua ammonia are added, depending upon the amount of air used. This should take eight to twelve hours. The remaining molasses is diluted to one hundred gallons with water and run in a constant stream into the fermenter, at such a rate that its addition will occupy all but two hours of the time desired to run the mash. The total mash time is usually about fifteen hours, but may be as long as twenty hours. With these quantities, no attention to the gravity is needed as this makes very little difference. The customary practice in raising the acidity at the end of the fermentation, and in regard to separating, cooling, etc., is followed.

From such a mash, a total yield of greater than the weight of the molasses taken should be easily obtained, using the organism described. The baking strength, color, and sugar-splitting activity will be good.

I do not wish to restrict the process to the use of crude cane molasses to the exclusion of refiners' molasses or beet molasses, or any other substances known to favor yeast growth, such as, for instance, grains, malts, the steep water of corn, as disclosed in the patent to Wagner, No. 1,434,462, and the various nitrogenous wastes of slaughter houses and packing houses, including tankage, the acid extract of bones and the like, all of which furnish good material for the growth of yeast.

While the newly isolated yeast has various advantages, its ability to grow in cane molasses and especially the crude Cuban cane molasses is perhaps its most marked characteristic and the most important characteristic from a practical standpoint as it permits the use of this relatively cheap raw material in the manufacture of yeast on a scale that compares favorably with the growth of other yeasts in beet molasses.

While I have described in detail the preferred practice of my process, it is to be understood that the details of procedure may be widely varied without departing from the spirit of the invention or the scope of the subjoined claims.

Having thus described my invention, I claim:

1. The method of growing yeast which comprises adding a yeast stock of *Saccharomyces disjunctus* to a mash of crude West Indian cane molasses and allowing the yeast to propagate therein.

2. A process of propagating *Saccharomyces disjunctus* which comprises inoculating an aqueous solution of crude West Indian molasses containing a compound containing the phosphate radical soluble in the same and a water soluble salt containing the ammonium radical with *Saccharomyces disjunctus* and propagating the *Saccharomyces disjunctus* in such solution.

3. A process of propagating *Saccharomyces disjunctus* which comprises inoculating a yeast propagating aqueous solution favorable to the development of such yeast with *Saccharomyces disjunctus*, said solution containing a compound containing the phosphate radical soluble in the same and water soluble salt containing the ammonium radical and carbamid, and propagating the *Saccharomyces disjunctus* in such solution.

4. A method of retarding growth of mycoderma yeast during propagation of a yeast of the Saccharomyces family which comprises inoculating a yeast propagating solution with *Saccharomyces disjunctus* and a yeast of the Saccharomyces family other than *Saccharomyces disjunctus* and allowing the last two mentioned added yeasts to propagate therein.

5. A method of retarding growth of mycoderma yeast during propagation of a yeast of the Saccharomyces family which comprises inoculating a yeast propagating solution with a yeast of the Saccharomyces family other than *Saccharomyces disjunctus* containing from 10 to 50 per cent of a culture of *Saccharomyces disjunctus* and allowing the inoculating yeasts to propagate therein.

6. A method of retarding growth of mycoderma yeast during propagation of a yeast of the Saccharomyces family which comprises inoculating a yeast propagating solution of crude West Indian molasses with *Saccharomyces disjunctus* and a yeast of the Saccharomyces family other than *Saccharomyces disjunctus* and allowing the last two mentioned added yeasts to propagate therein.

7. A process of propagating *Saccharomyces disjunctus* which comprises inoculating a yeast propagating aqueous solution of crude West Indian molasses containing a water soluble compound containing the phosphate radical and a water soluble salt containing the ammonium radical with *Saccharomyces disjunctus*, propagating the *Saccharomyces disjunctus* in such solution, and adding thereto during the propagation additional amounts of crude West Indian molasses, the water soluble compound containing the phosphate radical and the water soluble salt containing the ammonium radical.

In testimony whereof, I affix my signature.

ARNOLD K. BALLS.